US007326424B2

(12) United States Patent
van de Ligt et al.

(10) Patent No.: US 7,326,424 B2
(45) Date of Patent: Feb. 5, 2008

(54) ANIMAL FEED COMPOSITION

(75) Inventors: Christiaan P. A. van de Ligt, Elk River, MN (US); David A. Cook, Coon Rapids, MN (US); Mark D. Newcomb, Independence, MN (US)

(73) Assignee: CAN Technologies, Inc., Minnetonka, MN (US)

( * ) Notice: Subject to any disclaimer, the term of this patent is extended or adjusted under 35 U.S.C. 154(b) by 699 days.

(21) Appl. No.: 10/464,411

(22) Filed: Jun. 18, 2003

(65) Prior Publication Data

US 2004/0043107 A1 Mar. 4, 2004

Related U.S. Application Data

(60) Provisional application No. 60/389,803, filed on Jun. 19, 2002.

(51) Int. Cl.
*A23K 1/10* (2006.01)
(52) U.S. Cl. .......................... 424/438; 424/442; 426/2; 426/807
(58) Field of Classification Search ..................... None
See application file for complete search history.

(56) References Cited

U.S. PATENT DOCUMENTS

| | | | |
|---|---|---|---|
| 4,315,923 A | | 2/1982 | Takács et al. |
| 4,404,222 A | * | 9/1983 | Baker et al. ............. 514/238.8 |
| 4,544,559 A | | 10/1985 | Gil et al. |
| 4,666,891 A | | 5/1987 | Ginsberg et al. |
| 4,994,442 A | | 2/1991 | Gil et al. |
| 5,066,500 A | | 11/1991 | Gil et al. |
| 5,188,851 A | | 2/1993 | Mamoto et al. |
| 5,405,628 A | | 4/1995 | Ueda et al. |
| 5,488,039 A | | 1/1996 | Masor et al. |
| 5,492,899 A | | 2/1996 | Masor et al. |
| 5,607,840 A | | 3/1997 | Van Gorp et al. |
| 5,700,590 A | | 12/1997 | Masor et al. |
| 5,840,705 A | | 11/1998 | Tsukada et al. |
| 6,051,687 A | | 4/2000 | Meeker et al. |
| 6,174,551 B1 | | 1/2001 | Griffin et al. |
| 6,511,696 B2 | | 1/2003 | Gohman et al. |
| 2001/0049119 A1 | | 12/2001 | Lee et al. |

FOREIGN PATENT DOCUMENTS

| | | |
|---|---|---|
| EP | 0 196 530 | 10/1986 |
| GB | 889648 | 2/1962 |
| GB | 992201 | 5/1965 |
| JP | 2001-190230 | 7/2001 |
| SU | 1147330 | 3/1985 |
| WO | WO 94/12524 | 6/1994 |
| WO | WO 99/03893 | 1/1999 |
| WO | WO 01/49126 A1 | 7/2001 |
| WO | WO 02/065848 | 8/2002 |

OTHER PUBLICATIONS

JPAB abstract of JP-10165138 Jun. 23, 1998.*
International Search Report for PCT/US 03/19324, Date of mailing: Nov. 3, 2003, (5 sheets).
Abstract for Russian Patent No. SU 1147330, 2 pages.
Bucci, Luke R., Mucopolysaccharides (Chondroitin Sulfates) As Dietary Supplements: Sources, Production and Comparative Bioavailability, Chiropractic Products, Oct. 1988, pp. 54-56, printed from website www.redwings.org/HTMLarts/mpdieta.htm on Nov. 19, 2001.
Bueno, J. et al., Effect of dietary nucleotides on small intestinal repair after diarrhoea. Histological and ultrastructural changes, 1994, pp. 926-933, vol. 35, Department of Cell Biology, University of Granada, and PULEVA Research Department, Granada, Spain.
Bustamante, Sergio A. et al., Dietary Nucleotides: Effects on the Gastrointestinal System in Swine, Symposium: Nucleotides and Nutrition, 1994, pp. 149S-156S, American Institute of Nutrition.
Carver, J.D., Dietary nucleotides: effects on the immune and gastrointestinal systems, 1999, pp. 83-88, Acta Paediatr Suppl, vol. 430, Scandinavian University Press.
Carver, Jane D. et al., The role of nucleotides in human nutrition, Nutritional Biochemistry, 1995, pp. 58-72, vol. 6, Elsevier Science, Inc., New York, NY.
Carver, Jane E., Dietary Nucleotides: Cellular Immune, Intestinal and Hepatic System Effects, Symposium: Nucleotides and Nutrition, 1994, pp. 144S-148S, American Institute of Nutrition.
Chen, X.B. et al., Excretion of purine derivatives by ruminants: effect of exogenous nucleic acid supply on purine derivative excretion by sheep, British Journal of Nutrition, 1990, pp. 131-141, vol. 63.
Clifford, Andrew J., Nutrients with Special Functions: Proteins and Amino Acids in Tissue Maintenance, Nutrition and the Adult, date unknown, pp. 183-184, 192-196, 203, Plenum Press, New York and London.
Cosgrove, Michael, Nucleotides, Perinatal and Infant Nutrition, Nutrition, 1998, pp. 748-751, vol. 14, Elsevier Science, Inc., USA.
Dermatan Sulfate I, MW: 25,000, Enzyme Productoverview, 2 pages, printed from website www.kordia.nl/enzyme/glycohepfr/DS-I.html on Sep. 17, 2001.

(Continued)

*Primary Examiner*—Neil S. Levy
(74) *Attorney, Agent, or Firm*—Foley & Lander, LLP

(57) ABSTRACT

Animal feeds, which include compositions utilizing mucosa byproducts derived from mucosal material, such as digested gut material, are provided. The feeds can include a mucosa byproduct which contains at least about 10 wt. % nucleic acid material; at least about 20 wt. % mucopolysaccharides; and no more than about 10 wt. % proteinaceous material. The mucosa byproduct is produced by a process which includes digesting animal mucosal material to form a mucosal digest; and separating the mucosal digest to provide (a) a protein-enriched stream and (b) a polyanionic-enriched stream, which includes mucopolysaccharides and nucleic acid material.

21 Claims, No Drawings

OTHER PUBLICATIONS

Devresse, Bernard, Nutrient Levels in Some Commercial Shrimp Feeds and Feed Ingredients of Asia and Latin America—A Comparative Analysis, pp. 49-70, Inve Aquaculture, Belgium.

D'Mello, J.P.F., Utilization of dietary purines and pyrimidines by non-ruminant animals, Proc. Nutrition Soc., 1982, pp. 301-308, vol. 41.

El-Ashwah, E.T. et al., Utilization of Yeast in Nutrition II-Evaluation of Yeast Protein and its Potential Use as a Food Supplement, Egypt J. Microbiology, 1980, pp. 91-98, vol. 15, No. 1-2, Egypt.

Garattini, S., Glutamic Acid, Twenty Years Later, International Symposium on Glutamate: Keynote Presentation, 2000, pp. 901S-909S, American Society for Nutritional Sciences.

Gate, J.J. et al., The metabolic fate of the amido-N group of glutamine in the tissues of the gastrointestinal tract in 24 h-fasted sheep, British Journal of Nutrition, 1999, pp. 297-306, vol. 81.

Giesecke, D. et al., Availability and metabolism of purines of single-cell proteins in monogastric animals, Proc. Nutr. Soc., 1982, pp. 319-327, vol. 41.

Glycosaminoglycan (GAG), Proteoglycan (PG), Introduction of Our Laboratry, printed from website hygeia.p.chiba-u.ac.jp/lab/bunseki/English.htm on Sep. 18, 2001, 4 pages.

Howie, Michael, Condensed Porcine Solubles®, suitable source of energy, protein for swine, date unknown, 2 pages.

Huntington, Gerald. B., Uptake and transport of nonprotein nitrogen by the ruminant gut, Jul. 1986, pp. 2272-2276, vol. 45, No. 8, 0014-9446/86/0045, Federation Proceedings.

Jackson, Carlton D. et al., Dietary Nucleotides: Effects on Cell Proliferation Following Partial Hepatectomy in Rats Fed NIH-31, AIN-76A, or Folate/Methyl-Deficient Diets, Symposium: Animal Diets for Nutritional and Toxicological Research, 1997, pp. 834S-837S, American Society for Nutritional Sciences.

James, L.A. et al., Glutamine oxidation and utilization by rat and human oesophagus and duodenum, British Journal of Nutrition, 1999, pp. 323-329, vol. 81.

Kalexx, Ltd., The CosaminDS Difference, printed from website http://www.kalexx.com/pages/faq.html on Nov. 20, 2001.

Kanjanapruthipong, J. et al., Purine Derivatives Excreted in Urine as an Indicator Estimating Microbial Yield from the Rumen: A-Review, American Journal of Animal Science, 1998, pp. 209-216, vol. 11, No. 3.

Karasawa, Yutaka et al., Effect of Dietary RNA on Growth and Food Intake of Young Chicks, Jpn Poultry Science, 1990, pp. 165-172, vol. 27.

Kubota, T. et al., Adverse Effects of Low Concentrations of Dietary RNA Addition on the Growth, Food Intake and Kidney Weight of Young Chickens, British Poultry Science, 1994, pp. 585-588, vol. 35.

Lassalas, B. et al., Dosage des bases puriques et pyrimidiques par chromatographie liquide a haute performance, Ann Zootech, 1993, pp. 170-171, vol. 42.

Lindberg, J.E., Nitrogen and purine metabolism in preruminant and ruminant goat kids given increasing amounts of ribonucleic acids, Animal Feed Science and Technology, 1991, pp. 213-226, vol. 35, Elsevier Science Publishers B.V., Amsterdam.

McAllan, A.B., The fate of nucleic acids in ruminants, Proc. Nutr. Soc., 1982, pp. 309-317, vol. 41, Great Britain.

McAllan, A.B., The degradation of nucleic acids in, and the removal of breakdown products from the small intestines of steers, British Journal of Nutrition, 1980, pp. 99-112, vol. 44, 0007-1145/80/3453-2801, The Nutrition Society.

Mucopolysaccharides, University of Maryland Medicine, printed from website http://umm.drkoop.com/conditions/ency/article/002263.htm on Sep. 25, 2001, 1 page.

Newsholme, P. et al., Glutamine metabolism by lymphocytes, macrophages, and neutrophils; Its importance in health and disease, Journal of Nutr. Biochem, 1999, pp. 316-324, vol. 10, Elsevier Science Inc., New York.

Nucleic Acids, printed from website esg-www.mit.edu:8001/esgbio/lm/.../nucleicacids.htm on Sep. 18, 2001, 2 pages.

Nurti-Quest, Inc., Orotate supplementation for starter diet for swine, 1995, 2 pages.

Ogoshi, Shohei et al., Effects of Total Parenteral Nutrition with Nucleoside and Nucleotide Mixture on D-Galactosamine-Induced Liver Injury in Rats, Journal of Parenteral and Enteral Nutrition, Jan./Feb. 1988, pp. 53-57, 0148-6071/88/1201-0059, American Society of Parenteral and Enteral Nutrition.

Porcine Somatotropin (pST), Biotechnology Information Series, printed from website http://www.biotech.iastate.edu/biotech_info_series/bio4.html on Sep. 17, 2001, 12 pages.

Provost, Marc, Nucleotides, Un nouveau potentiel, la revue de l'alimentation animale, Sep. 1998, pp. 52-54.

Quan, Richard et al., Do Infants Need Nucleotide Supplemented Formula for Optimal Nutrition?, Journal of Pediatric Gastroenterology and Nutrition, 1990, pp. 429-434, vol. 11, No. 4, Raven Press, New York.

Reeds. Peter J. et al., Intestinal Glutamate Matabolism, Glutamate and Glutamine in Metabolism, 2000, pp. 978S-982S, American Society for Nutritional Sciences.

Romans, John R. et al., Pork and Pork Quality, printed from website http://www.genome.iastate.edu/edu/PIH/128.html on Sep. 17, 2001, 16 pages, Purdue University, Cooperative Extension Service, West Lafayette, Indiana.

Rudolph, Frederick B., et al., Role of NRA as a Dietary Source of Pyrimidines and Purines in Immune Function, Symposium Proceedings, Nutrition, Jan./Feb. 1990, pp. 45-52, vol. 6, No. 1.

Sanderson, Ian R. et al., Nucleotide Uptake and Metabolism by Intestinal Epithelial Cells, Symposium: Nucleotides and Nutrition, 1994, pp. 131S-137S, American Institute of Nutrition.

Schlimme, E. et al., Species-specific composition pattern of milk ribonucleosides and -nucleotides: chemical and physiological aspects, Institute for Chemistry and Physics, Federal Dairy Research Centre, Kiel, date unknown, 22 pages.

Sigal, Leonard H. et al., Molecular Biology and Immunology for Clinicians, Nucleic Acid Electrophoresis Techniques: Southern and Northern Blot and Restriction Fragment Length Polymorphisms, Journal of Clinical Rheumatology, Dec. 1996, pp. 331-335, vol. 2, No. 6.

Sinal, Yehudith et al., Enhancement of Resistance to Infectious Diseases by Oral Administration of Brewer's Yeast, Infection and Immunology, May 1974, pp. 781-787, vol. 9, No. 5, American Society for Microbiology.

Thorell, Lars et al., Nucleotides in Human Milk: Sources and Metabolism by the Newborn Infant, Pediatric Research, 1996, pp. 845-852, vol. 40, No. 6, International Pediatric Research Foundation, Inc.

Tsujinaka, Toshimasa et al., Role of Supplementation of a Nucleic Acid Solution on the Intestinal Mucosa Under Total Parenteral Nutrition, Symposium Proceedings, Nutrition, 1997, pp. 369-371, vol. 13, No. 4, Elsevier Science Inc., USA.

Uauy, Ricardo et al., Role of Nucleotides in Intestinal Development and Repair: Implications for Infant Nutrition, Symposium: Dietary Nucleotides: A Recently Demonstrated Requirement for Cellular Development and Immune Function, 1994, pp. 1436S-1441S, American Institute of Nutrition.

Uauy, Ricardo, Nonimmune System Responses to Dietary Nucleotides, Symposium: Nucleotides and Nutrition, 1994, pp. 157S-159S, American Institute of Nutrition.

Usami, Makoto et al., The Effect of a Nucleotide-Nucleoside Solution on Hepatic Regeneration in Rats After Partial Hepatectomy and in Primary Monolayer Culture of Hepatocytes, Symposium Proceeding, Nutrition, 1997, pp. 365-368, vol. 13, No. 4, Elsevier Science Inc., USA.

Uses made of the cattle carcass, date unknown, pp. 66-72.

Verbic, J. et al., Excretion of purine derivatives by ruminants, Effect of microbial nucleic acid infusion on purine derivative excretion by steers, Journal of Agricultural Science, 1990, pp. 243-248, vol. 114, Great Britain.

Watford, Malcolm, Is there a requirement for glutamine catabolism in the small intestine?, British Journal of Nutrition, 1999, pp. 261-262, vol. 81, Nutrition Society.

Witte, David P. et al., Coordinate Developmental Regulation of Purine Catabolic Enzyme Expression in Gastrointestinal and Postimplantation Reproductive Tracts, The Journal of Cell Biology, 1991, cover page and pp. 179-190, vol. 115, The Rockefeller University Press.

Yamamoto, Shigeru et al., Role of Nucleosides and Nucleotides in the Immune System, Gut Reparation after Injury, and Brain Function, Symposiuim Proceedings, Nutrition, 1997, pp. 372-374, vol. 13.

Yi, G.F. et al., PSA Nutrition: Feed Ingredients II, Journal of Animal Science, vol. 79, Supplement 1/Journal of Dairy Science, vol. 84, Supplement 1/Poultry Science, vol. 80, Supplement 1, 54th Annual Reciprocal Meat Conference, vol. II, 2001, p. 201, abstracts 833, 834 and 835.

Young, Vernon R. et al., Glutamate: An Amino Acid of Particular Distinction, International Symposium on Glutamate: Keynote Presentation, 2000, pp. 892S-900S, American Society for Nutritional Sciences.

Zollner, N., Purine and pyrimidine metabolism, Symposium Proceedings, Proc. Nutr. Soc., 1982, pp. 329-342, vol. 41.

Zomborszky-Kovacs, Melinda et al., The effect of β-carotene and nucleotide base supplementation on maematological, biochemical and certain immunological parameters in weaned pigs, Journal of Animal and Feed Sciences, 1998, pp. 245-251, vol. 7, Hungary.

* cited by examiner

ANIMAL FEED COMPOSITION

CROSS REFERENCE TO RELATED APPLICATIONS

The present application claims priority of U.S. Provisional Application 60/389,803, filed on Jun. 19, 2002, the disclosure of which is herein incorporated by reference.

BACKGROUND

In food production, and specifically producing animal products such as milk, beef, pork, eggs, chicken, fish etc., there is a constant need to improve production efficiency. Production efficiency, i.e. producing the maximum quantity of animal products while minimizing the time and/or cost of production for those products, is important in maintaining a competitive advantage.

Producers are constantly trying to increase these production efficiencies. One way of increasing production efficiencies is by altering the feed which animals are fed. For example, a feed with certain amounts of nutrients can cause an animal to grow or produce animal products quickly and/or perform better, whereas a different feed with different amounts of nutrients may cause an animal to grow or produce animal products on a more cost effective basis.

Since feed often comprises the largest portion of total animal production costs, providing well-balanced rations makes economic sense. When the ration is properly balanced for energy and all other essential food nutrients, the amount of feed consumed will generally determine an animal's growth rate and feed efficiency.

For both economic and environmental reasons, there is continued pressure to make productive of an increasing percentage of the waste material generated as a result of the slaughter of animals, such as livestock. A major use of livestock waste or other by-products is in the production of the blood anti-coagulant heparin. It has been estimated that over 90 wt. % of the heparin currently used as a-blood anti-coagulant is obtained from porcine intestinal mucosa.

Mucosa byproducts associated with heparin extraction from mucosal material typically contain chondroitin sulfate and other mucopolysaccharides (also sometimes referred to in the art as glucosaminoglycans or "MBP"). The mucopolysaccharides can include one or more of a number of types of glucosaminoglycans, such as hyaluronic acid, chondroitin sulfate, dermatin sulfate, keratin sulfate, heparin sulfate and heparin. Some of these glucosaminoglycans have recently appeared in the human and nutraceutical industries as treatments for arthritis and other cartilage related challenges. It should be noted that other sources of glucosaminoglycans include, shellfish and plants, and sources of cartilage such as trachea, aorta, nasal septa. Currently, the bulk of mucopolysaccharides (less heparin) produced as a result of the heparin industry are often simply dumped as waste material into the municipal sewage system and lost at a significant cost or the waste material is routed back and combined into another byproduct stream (e.g., peptone product).

SUMMARY

The present feed compositions may include compositions utilizing mucosa byproducts derived from mucosal material such as digested gut material. Such mucosa byproducts are typically derived from the residues from extraction processes employed to isolate heparin from such materials. The mucosa byproducts utilized in the present feed compositions commonly contain substantial amounts of mucopolysaccharides and nucleic acid materials. The amount of protein and/or amino acid(s) present in the mucosa byproducts employed in the present animal feeds is commonly quite low, e.g., no more than about 5 to 10 wt. %. Due to the amount of nucleic acid material present, the mucosa byproducts can typically contain up to about 50 wt. % crude protein. Since this latter value is based on a measurement of the total amount of nitrogen in a material, the presence of other nitrogen-containing compounds (e.g., nucleic acids, ammonium salts and/or glucosaminoglycans) can result in crude protein value that is substantially higher than the actual amount of proteinaceous material in a sample. As used herein, the term "proteinaceous material" refers to the total amount of amino acid(s), protein and/or other polypeptides present in a given sample. The amount of crude protein in a sample can be determined by the Kjeldahl method described in American Organization of Analytical Chemists. AOAC Official Method 976.05 Protein (crude) in "Animal Feed. Automated Kjeldahl Method," AOAC $16^{th}$ Ed., volume 1, chapter 4 subchapter 2, method 05. The mucosa byproducts may be blended with and/or incorporated into carrier products, such as soy hulls, soy flour, vegetable fiber, and the like before being mixed with other ingredients to form the present animal feeds. The inclusion of mucosa byproducts in an animal feed can improve the weight gain and/or feed efficiency, particularly when fed to newly weaned or intestinally challenged animals.

The animal feeds described herein may be advantageous used as feed for a wide variety of animals. For example, such feeds may include pet foods which are used to feed smaller domesticated animals such as dogs and cats. The feeds may also be designed for use with larger animals, such as horses, dairy cattle and/or swine.

As used herein, the term "mucosal material" refers to material derived from animal tissue having endothelial and/or mucosal components. Typical examples of such materials include livestock by-products, including gastrointestinal, tracheal or bronchial tissues, and/or other offal tissues. The process water of livestock or meat processing establishments may also be employed. A particularly suitable source of mucosa raw material is pork intestines. Particularly suitable examples of mucosal material for use producing mucosa byproducts include the mucosa tissue is derived from intestines, e.g., porcine hash guts and/or porcine intestinal mucosa. Additional sources of suitable raw material include, for example, intestinal skin, adventitia, trachea, lung and/or liver of animals such as pigs, cattle and/or sheep.

The term "mucosa byproducts" is used herein to refer to materials derived by removal of a substantial portion of proteinaceous materials from mucosal material. Mucosa byproducts commonly include nucleic acid material and one or more mucopolysaccharides, e.g., chondroitin A, chondroitin sulfate, dermatin sulfate, heparin sulfate, heparin or mixtures of mucopolysaccharides which include these compounds. Typically, the mucosa byproducts include at least about 10 wt. % nucleic acid material; at least about 20 wt. % mucopolysaccharides; and no more than about 10 wt. % proteinaceous material. More suitably, the mucosa byproducts include at least about 15 wt. % nucleic acid material and, more preferably at least about 20 wt. % nucleic acid material. Mucosa byproducts, which include at least about 25 wt. % nucleic acid material; at least about 30 wt. % mucopolysaccharides; and no more than about 5 wt. % proteinaceous material, are particularly suitable for use in the present animal feeds.

As referred to herein, the term "nucleic acid material" includes nucleic acids, nucleotides, nucleosides, and/or nucleic acid-derived bases. Examples of suitable nucleotides include adenylic acid, guanylic acid, cytidylic acid, thymidylic acid, uridylic acid, inosinic acid, and/or the salts thereof. Examples of suitable nucleosides include guanosine, deoxyguanosine, adenosine, deoxyadenosine, cytidine, deoxycytidine, thymidine, deoxythymidine, uridine, deoxyuridine, inosine and/or deoxyinosine. Examples of suitable bases of the structural components of nucleic acids include salts of guanine, cytosine, thymine and uracil and/or adenine, e.g., hydrochloride salts of one or more of these purine and pyrimidine bases. The present animal feeds include nucleic acid material, which may commonly contain the nucleotides, the nucleosides and/or the purine and pyrimidine bases of the structural component of nucleic acids. Mixtures of purine and pyrimidine bases, e.g., mixtures of AMP, GMP, UMP and CMP may be obtained by hydrolyzing ribonucleic acid (e.g., from a yeast) with 5'-phosphodiesterases into 5'-nucleotides. To obtain a mixture of IMP, GMP, UMP and CMP, the mixture of AMP, GMP, UMP and CMP may be treated with one or more deaminases.

DETAILED DESCRIPTION

The present application provides animal feeds which may include mucopolysaccharides and a somewhat elevated level of nucleic acid material in addition to the nutrient profile which is commonly present in such a feed. For example, the animal feed may include a mucosa byproduct produced by a process which includes digesting animal mucosal material to form a mucosal digest; separating the mucosal digest to provide a protein-enriched stream (i.e., a process stream enriched in proteinaceous material) and a polyanionic-enriched stream (in this instance, the "mucosal byproduct"), which includes mucopolysaccharides and nucleic acid material. Mucosal byproducts suitable for use in the present animal feeds can commonly include about 10-40 wt. % nucleic acid material and up to about 80 wt. % mucopolysaccharides. More desirably, such mucosal byproducts include at least about 20 wt. % mucopolysaccharides. The present feed may include about 0.1 to 2.0 wt. % of the mucosa byproduct. Such feeds may commonly include about 100 ppm to 5000 ppm mucopolysaccharide(s), such as chondroitin material. These feeds also typically include about 150 to 4,000 ppm nucleic acid material. As used herein, the term "chondroitin material" refers to any compounds which include a chondroitin moiety and may also include other functional groups such as sulfate groups. For example, the chondroitin material in a given sample may include chondroitin and/or chondroitin sulfate. The mucosa byproduct commonly includes about 50 wt. % chondroitin material. The present feeds advantageously may include about 100 ppm to 2500 ppm mucopolysaccharides, such as chondroitin material. For certain applications, feeds which include about 100 ppm to 600 ppm chondroitin material may be particularly useful. For other applications, feeds which include about 1,000 ppm to 3,000 ppm mucopolysaccharides and about 2,000 ppm to 4,000 nucleic acid material may be desirable.

In one embodiment, the present animal feed may have a nutrient profile which includes crude protein, fat, fiber, lactose, mucopolysaccharides and nucleic acid material. For example, such an animal feed may include about 18 to 30 wt. % crude protein; about 1 to 6 wt. % fat; about 2 to 6 wt. % fiber; about 5 to 30 wt. % lactose; at least about 0.1 wt. % mucopolysaccharides; and about 0.05 to 0.6 wt. % nucleic acid material (more commonly about 0.1 to 0.5 wt. % nucleic acid material). Feeds of this type may be suitable for use in effectively feeding young pigs and can be particularly suitable for feeding weaning piglets. When used to feed weaning piglets, the present feeds commonly include about 0.2 to 0.4 wt. % nucleic acid material and about 0.1 to 0.3 wt. % mucopolysaccharides (e.g., a mixture which includes heparin and chondroitin sulfate).

Another embodiment of the present animal feed includes a mucosa byproduct, which includes at least about 15 wt. % nucleic acid material; at least about 20 wt. % mucopolysaccharides; and no more than about 10 wt. % protein. In an even more desirable example, the mucosal byproduct used to form an animal feed includes at least about 20 wt. % nucleic acid material; at least about 20 wt. % mucopolysaccharides; and no more than about 5 wt. % proteinaceous material. In an even more suitable formulation, the present animal feed may include a mucosa byproduct which includes at least about 25 wt. % nucleic acid material (e.g., about 25 to 40 wt. % nucleic acid material).

Methods of enhancing the utilization of feed by animals are also provided herein. Such methods may include enhancing the utilization of feed in an animal by feeding the animal a feed, which includes a mucosa byproduct. The mucosa byproduct can be produced by a process which includes digesting animal mucosal material to form a mucosal digest; separating the mucosal digest to provide a polyanionic-enriched stream, which includes mucopolysaccharides and nucleic acid material, and a protein-enriched stream. In other embodiments, the methods may include feeding an animal a feed composition including a mucosa byproduct; where the mucosa byproduct includes at least about 10 wt. % nucleic acid material; at least about 20 wt. % mucopolysaccharides; and no more than about 10 wt. % proteinaceous material. In certain embodiments, the methods may include feeding the animal a feed which includes about 18 to 50 wt. % crude protein; about 1 to 6 wt. % fat; at least about 0.01 wt. % mucopolysaccharides; and about 0.01 to 0.6 wt. % nucleic acid material. In many instances, the feed preferably includes about 18 wt. % to 30 wt. % crude protein. Such feeds may also include about 5 to 30 wt. % and, more desirably, about 5 to 20 wt. % lactose.

Mucosa byproducts are commonly derived from products from the slaughter of animals. For example, mucosa product may be obtained by treating via hydrolysis of porcine hash gut, intestinal mucosa, and/or any animal tissue having an endothelial or mucosal component to provide a crude hydrozylate material. The crude hydrozylate generally contains mucopolysaccharides, nucleic acid material, and peptones. The hydrozylate is often processed, e.g., by passage through an appropriate ion exchange resin, to separate heparin and other polyanionic materials from peptones. This may be carried out by passing the crude hydrozylate through a column filled with the ion exchange resin. The heparin and other anionic materials are bound to the column and may be released by flushing the column with salt solutions. After release of the bulk of the bound heparin, the column may be flushed with a solution having a higher salt concentration to provide a post-column flush material. Such post-column flush material is also referred to herein as "mucosa byproducts". During processing, prior to digestion the raw mucosal material may be subjected to an initial ultrafiltration or reverse osmosis operation to reduce the water and salt content of the starting material.

Scheme 1 below provides a schematic diagram of a typical process used to isolate heparin and/or other mucopolysaccharides from mucosal material.

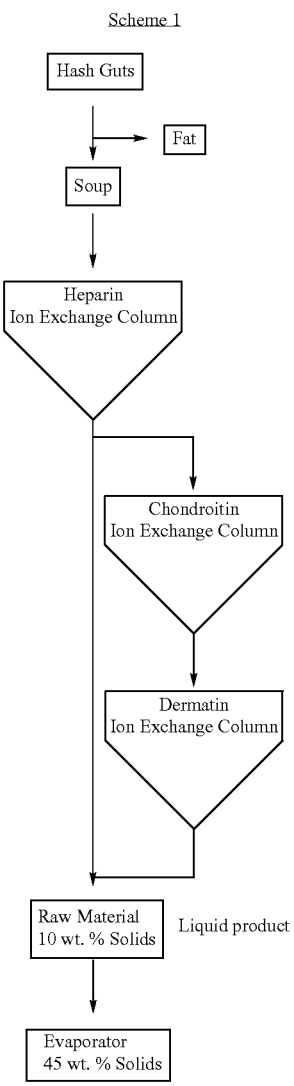

Scheme 1

In the process depicted in Scheme 1, an aqueous solution containing mucosa material, e.g., from the livestock offal, is commonly chemically (acid or alkaline) or enzymatically digested to produce material which includes peptones (also referred to in the art as protein hydrolysates). Once concentrated and dried the protein hydrolysates are commonly referred to as porcine soluble products. These products have been used as sources of amino acids, seasoning agents, and palatability enhancers and in nutrition, among other things.

After digestion, the protein hydrolysates are typically further processed as shown in Scheme 1 to remove much of the nucleic acid material and mucopolysaccharides which may be present. For example, the digested animal solution may be depleted of 'impurities', including heparin and certain other anionic and polyanionic impurities, by selective sorption onto an anion exchange resin. The resin is then generally flushed to release bound heparin and residual bound material is recovered by subsequent washing of the resin (e.g., with a higher salt content solution). In some instances, the recovered residual bound material may be further treated to recover other specific mucopolysaccharides, such as chondroitin sulfate or dermatin sulfate. This may be accomplished by selective sorption onto an anion exchange resin, usually accomplished via passage of the recovered residual bound material through one or more additional ion exchange columns (as shown in Scheme 1). The mucosal byproducts employed in the present feed compositions may include the recovered residue from the heparin column and/or recovered residue from one or more other resin sorption processes used to isolate other mucopolysaccharides.

ILLUSTRATIVE EMBODIMENTS

The present animal feed may include a mucosa byproduct produced by a process which includes digesting animal mucosal material to form a mucosal digest. The mucosal digest may then be separated to provide (1) a polyanionic-enriched stream, which includes mucopolysaccharides and nucleic acid material, and (2) a protein-enriched stream. The process used to produce the mucosa byproduct may also include separating the polyanionic-enriched stream to provide (1) a residue stream, which includes mucopolysaccharides and nucleic acid material, and (2) a heparin-enriched stream. For example, this may be carried out by passing polyanionic-enriched stream through a cationic exchange resin and subsequently flushing the resin with a gradient of salt solutions to flush bound materials off the resin. Typically, a heparin-enriched stream is flushed off the resin by salt solutions having a lower salt concentration and the remaining residue is flushed off the resin by higher salt concentrations. In some instances, the residue stream may be further processed to provide an mucopolysaccharides-depleted residue stream, which includes nucleic acid material and lower levels of mucopolysaccharides and an mucopolysaccharides-enriched stream, which includes mucopolysaccharides such as chondroitin sulfate, dermatin sulfate or a mixture thereof.

The mucosa byproducts employed in the present animal feeds typically include heparin, chondroitin sulfate, dermatin sulfate or a mixture thereof together with a substantial amount of nucleic acid material. The mucosa byproducts may also contain relatively low amounts of other components such a hydrolyzed protein, ash. Due to the nature of the processing employed, the fat content of the mucosa byproducts is generally quite low, e.g., no more than about 1 or 2 wt. %. In some instances, the mucosa byproduct has a mucopolysaccharide/nucleic acid material weight ratio of at least about 1.0, i.e., the mucosa byproduct includes a larger amount (on a weight basis) of mucopolysaccharides than nucleic acid material.

The present feed may be derived from animal mucosal material which includes livestock by-products including gastrointestinal tissue, tracheal tissue, bronchial tissue or a mixture thereof. A particularly suitable source of the animal mucosal material used to produce the mucosa byproducts is porcine hash guts.

Another embodiment present animal feed may have a nutrient profile which includes crude protein, fat, fiber, lactose, mucopolysaccharides and nucleic acid material. For example, such an animal feed may include about 18 to 30 wt. % crude protein; about 1 to 6 wt. % fat; about 5 to 30 wt. % lactose; at least about 0.1 wt. % mucopolysaccharides; and about 0.05 to 0.6 wt. % nucleic acid material. Such animal feeds more commonly include about 0.1 to 0.6 wt. % nucleic acid material and, more desirably, about 0.2 to 0.5 wt. % nucleic acid material. Mucosa byproducts suitable for use in producing the present feed typically include about 10 to 40 wt. % nucleic acid material; about 20 to 45 wt. % mucopolysaccharides; and no more than about 10 wt. % crude protein. The mucosa byproduct commonly has an ash content of about 15 to 30 wt. %. The mucosa byproduct is suitably incorporated into the feed such that it makes up about 0.1 to 2.5 wt. % of the total weight of the feed. In some instances the feed more desirably includes about 0.2 to 1.5 wt. % of the mucosa byproduct. Where the feed is designed to be used with young pigs, feeds which include about 0.2 to 0.5 wt. % nucleic acid material, may be particularly desirable. More preferably, such feeds include about 0.2 to 0.4 wt. % nucleic acid material. The nucleic acid material can include nucleic acids, nucleotides, nucleosides, nucleic acid-derived bases or a mixture thereof.

In yet another embodiment, the present animal feed may have a nutrient profile which includes crude protein, fat, lactose, mucopolysaccharides and nucleic acid material. For example, such an animal feed may include about 18 to 30 wt. % crude protein; about 1 to 6 wt. % fat; about 5 to 30 wt. % lactose; at least about 0.1 wt. % mucopolysaccharides; and about 0.1 to 0.6 wt. % nucleic acid material. Feeds of this type may be suitable for use in effectively feeding young pigs and can be particularly effective for use with younger pigs. Such feeds may be designed to include substantial levels of other components, e.g., about 100 to 300 ppm Cu and/or about 1,000 to 4,000 ppm Zn. The present animal feeds commonly include nucleic acid material which has a purine/pyrimidine ratio of about 1.0 but in some instances the nucleic acid material may have a purine/pyrimidine ratio of about 1.5 or greater.

EXAMPLES

The following examples are presented to illustrate the present invention and to assist one of ordinary skill in making and using the same. The examples are not intended in any way to otherwise limit the scope of the invention.

Example 1

Nutrient Analysis

Three batches of spray dried mucoa byproducts ("MBP") were analyzed by HPLC (High Performance Liquid Chromatography) as well as for moisture content, crude protein content and crude ash content. The results of the analysis are presented in Table 1 below together with the composition for a typical batch of mucosa byproduct suitable for use in the present animal feeds.

TABLE 1

Approximate Nutrient Composition of Mucosa Byproducts.

| Nutrient/characteristic | MBP 1A | MBP 1B | MBP 1C | Common MBP |
|---|---|---|---|---|
| Appearance | Off white to tan colored, Powder | Off white to tan colored, Powder | Off white to tan colored, Powder | Off white to tan powder |
| Moisture, wt. % | 18.3 wt. % | 21.5 wt. % | — | 8-25 wt. % |
| Crude Protein (wt. %) | 38.6 wt. % | 24.2 wt. % | — | 20-50 wt. % |
| Crude Fat (wt. %) | 0.19 wt. % | 0.16 wt. % | — | <0.25 wt. % |
| Crude Ash (wt. %) | 24.0 wt. % | 23.7 wt. % | — | 20-45 wt. % |
| Heparin (wt. %) | — | 14 wt. % | 8.8 wt. % | 5-30 wt. % |
| Chondroitin A (wt. %) | — | 8.7 wt. % | 17 wt. % | 5-20 wt. % |

TABLE 1-continued

Approximate Nutrient Composition of Mucosa Byproducts.

| Nutrient/characteristic | MBP 1A | MBP 1B | MBP 1C | Common MBP |
|---|---|---|---|---|
| Dermatin (wt. %) | — | 15 wt. % | <0.1 wt. % | 0-20 wt. % |
| Heparin SO$_4$ (wt. %) | — | Detected | Detected | Detected |
| Total Heparin + Chondroitin A + Dermatin (wt. %) | — | 31.8 wt. % | 25.8 wt. % | 10-40 wt. % |
| Nucleic Acids (wt. %) | — | 32 wt. % | 15.9 wt. % | 10-40 wt. % |
| Protein (wt. %) | — | 1.6 wt. % | >4 wt. % | 0-10 wt. % |

Example 2

Initial Dose Response Trial with Mucosa Byproducts (MBP)

Mucosa byproducts were tested as a substitute for porcine digest (a protein hydrozylate derived from swine hash guts; available as Protein Plus® feed additive (available from RDE, Inc, Crystal lake, Ill.). A dose response approach with a negative (no porcine digest) and positive control (with 2.5 wt. % porcine digest) was conducted. Pigs (n=144) were weaned at approximately 19 days of age, blocked by weight and allotted to 6 treatments at the start of phase 1 and phase 2. Phase 1 (first 7 days post weaning) pigs weighed an average of 12.4 ±2.7 lbs. Phase 2 (day 8 to 20 post weaning) pigs weighed 15.3±3.1 lbs.

The diets included mucosa byproduct MBP 1A and were formulated to:

| Phase 1 | Phase 2 |
|---|---|
| 23.0 wt. % CP | 21.0 wt. % CP |
| 4.8 wt. % Fat | 2.4 wt. % Fat |
| 1.53 wt. % Lys | 1.30 wt. % Lys |
| 0.98 wt. % Ca | 0.91 wt. % Ca |
| 0.86 wt. % P | 0.79 wt. % P |
| 0.47 wt. % Na | 0.3 wt. % Na |
| 126 ppm Cu | 250 ppm Cu |
| 2660 ppm Zn | 2660 ppm Zn |
| 3375 kcal ME | 3200 kcal ME |
| 18.2 wt. % Lactose | 11.1 wt. % Lactose |

The Phase 1 results (see Table 2) indicated that inclusion of mucosa byproducts ("MBP") in the diet increased gain and improved feed efficiency. Mucosa byproducts improved gain and feed efficiency equal or greater than 2.5 wt. % porcine digest at a much lower inclusion rate compared to the negative control treatment.

The Phase 2 results (see Table 3) showed an increased gain and improved feed efficiency of mucosa byproducts compared to the both the negative and positive control treatments.

TABLE 2

Pig Performance in Phase 1

| Dietary Treatment | Gain (lbs/d) | Feed intake (lbs/d) | Feed Efficiency |
| --- | --- | --- | --- |
| Negative Control | 0.37 | 0.43 | 1.21 |
| 0.10 wt. % MBP | 0.38 | 0.42 | 1.18 |
| 0.20 wt. % MBP | 0.42 | 0.46 | 1.17 |
| 0.30 wt. % MBP | 0.45 | 0.47 | 1.12 |
| 0.40 wt. % MBP | 0.43 | 0.43 | 1.06 |
| 2.5 wt. % Porcine Digest | 0.40 | 0.43 | 1.12 |

TABLE 3

Pig Performance in Phase 2

| Dietary Treatment | Gain (lbs/d) | Feed intake (lbs/d) | Feed Efficiency |
| --- | --- | --- | --- |
| Negative Control | 0.85 | 1.05 | 1.25 |
| 0.10 wt. % MBP | 0.85 | 1.06 | 1.25 |
| 0.20 wt. % MBP | 0.88 | 1.16 | 1.33 |
| 0.30 wt. % MBP | 0.88 | 1.09 | 1.27 |
| 0.40 wt. % MBP | 0.85 | 1.05 | 1.24 |
| 2.5 wt. % Porcine Digest | 0.85 | 1.14 | 1.35 |

Example 3

Effect of MBP or Protein Hydrolyzate on Performance

Mucosa byproducts (MBP) were compared to porcine digest (Protein Plus® feed additive) and tested for possible interactions. A dose response experiment of MBP in diets with and without 2.5 wt. % porcine digest was conducted. Pigs (n=144) were weaned at approximately 19 days of age, blocked by weight and allotted to 8 treatments at the start of phase 1 and treatments were carried over into phase 2. In phase 1, first 7 days post weaning, pigs had an average start weight of 14.3 lbs. In phase 2, day 8 to 20 post weaning, pigs had an average start weight of 17.3 lbs.

The diets included mucosa byproduct MBP 1B and were formulated to:

| Phase 1 | Phase 2 |
| --- | --- |
| 23.0 wt. % CP | 19.5 wt. % CP |
| 5.1 wt. % Fat | 2.7 wt. % Fat |
| 1.54 wt. % Lys | 1.30 wt. % Lys |
| 0.98 wt. % Ca | 0.92 wt. % Ca |
| 0.85 wt. % P | 0.80 wt. % P |
| 0.44 wt. % Na | 0.32 wt. % Na |
| 124 ppm Cu | 250 ppm Cu |
| 2660 ppm Zn | 2650 ppm Zn |
| 3400 kcal ME | 3200 kcal ME |
| 17.8 wt. % Lactose | 10.8 wt. % Lactose |

Protein Plus™ feed additive inclusion in diets in Phase 1 resulted in an increased average daily gain and average daily feed intake (see Table 4). Feed efficiency tended to improve with Protein Plus® feed additive addition. Growth performance of pigs fed different levels of MBP was different between diets with and without Protein Plus® feed additive. Increasing levels of MBP tended to increase average daily gain linearly in diets without Protein Plus® feed additive, while no effect was seen in diets with Protein Plus® feed additive. MBP diet not affect average daily feed intake significantly. Feed efficiency tended to improve linearly with MBP addition regardless of Protein Plus® feed additive inclusion. However, Improvements in feed efficiency were greater in diets without Protein Plus® feed additive. Interactions between MBP and Protein Plus® feed additive were not observed.

Numerically, The beneficial effect of MBP inclusion in non-Protein Plus® feed additive containing diets seemed to plateau at the 0.4 wt. % MBP level. Addition of MBP to a Protein Plus® feed additive containing diet seemed to improve feed efficiency numerically, however, a low level of MBP (0.2 wt. %) gave the best result.

TABLE 4

Pig Performance in Phase 1

| Dietary Treatment | Gain (lbs/d) | Feed intake (lbs/d) | Feed Efficiency |
| --- | --- | --- | --- |
| .0 wt. % MBP, 0 wt. % PP | 0.36 | 0.44 | 1.37 |
| .2 wt. % MBP, 0 wt. % PP | 0.39 | 0.44 | 1.21 |
| .4 wt. % MBP, 0 wt. % PP | 0.43 | 0.48 | 1.17 |
| .6 wt. % MBP, 0 wt. % PP | 0.43 | 0.47 | 1.13 |
| .0 wt. % MBP, 2.5 wt. % PP | 0.48 | 0.49 | 1.18 |
| .2 wt. % MBP, 2.5 wt. % PP | 0.49 | 0.52 | 1.09 |
| .4 wt. % MBP, 2.5 wt. % PP | 0.42 | 0.50 | 1.14 |
| .6 wt. % MBP, 2.5 wt. % PP | 0.46 | 0.50 | 1.13 |

In Phase 2, diets containing Protein Plus® feed additive resulted in a decreased average daily gain and average daily feed intake, while feed efficiency was not significantly affected (see Table 5). Inclusion of MBP did not result in significant changes in average daily gain, average daily feed intake, and feed efficiency. Numeric results showed a decrease in average daily gain and average daily feed intake in diets containing Protein Plus® feed additive. No interactions were observed between MBP and the Protein Plus® feed additive. Also the response to MBP was reduced when diets also contained the Protein Plus® feed additive.

TABLE 5

Pig Performance in Phase 2

| Dietary Treatment | Gain (lbs/d) | Feed intake (lbs/d) | Feed Efficiency |
| --- | --- | --- | --- |
| .0 wt. % MBP, 0 wt. % PP | 0.99 | 1.27 | 1.30 |
| .2 wt. % MBP, 0 wt. % PP | 1.02 | 1.26 | 1.24 |
| .4 wt. % MBP, 0 wt. % PP | 0.96 | 1.21 | 1.33 |
| .6 wt. % MBP, 0 wt. % PP | 0.98 | 1.28 | 1.32 |
| .0 wt. % MBP, 2.5 wt. % PP | 0.93 | 1.21 | 1.31 |
| .2 wt. % MBP, 2.5 wt. % PP | 0.87 | 1.18 | 1.36 |
| .4 wt. % MBP, 2.5 wt. % PP | 0.85 | 1.15 | 1.36 |
| .6 wt. % MBP, 2.5 wt. % PP | 0.87 | 1.15 | 1.34 |

Adding Protein Plus® feed additive improved growth responses in phase 1 and reduced growth responses in phase 2 of the nursery. However, it is believed that the response is not reflective of the commercial situation; rather, the animals in these trials were under minimal stress and therefore, the decreased response was observed.

The use of increased levels of MBP improved average daily gain and feed efficiency linearly, while feed intake was not affected. The average daily gain response seemed to plateau at 0.4 wt. % MBP inclusion, while feed efficiency appeared to maintain a linear response. Phase 1 showed the largest magnitude of response while the response in phase 2 was more marginal. The larger response in Phase 1 could be due to a higher need on the part of the pigs at this development stage for nucleotides to regenerate the intestinal villi. The villi generally degenerate due to reduced feed intake after weaning. During Phase 2, the intestinal epithelium of the pigs is generally considered to be regenerated, and the need for nucleotides would be expected to be reduced.

Example 4

Comparison MBP with Synthetic Nucleotides

The objective of the study was to compare the effect of mucosa byproducts (MBP) versus a synthetic source of nucleotides (NTs). Therefore the mucosa byproducts were tested individually and in combination. The nucleic acid content was tested with synthetic nucleic acids ("NTs" is a 50:50 mixture of IMP +GMP; available commercially from Ajinimoto) and purified chondroitin sulfates ("CS", Nutraceuticals Group of Cargill, Minneapolis, Minn.). In addition to a negative control, two additional treatments were included. One examined the additivity of added synthetic nucleotides and chondroitin sulfate. The final treatment included the MBP stream from the initial trial (described in Example 1 as MBP 1B) as a positive control. The level of MBP was selected to provide a similar level of added nucleotices and chondroitin sulfate as that found in the combined treatment.

Pigs (n=144) were weaned at approximately 19 days of age, blocked by weight and allotted to 8 treatments at the start of phase 1 and phase 2. In phase 1, first 7 days post weaning, pigs had an average start weight of 13.2 lbs. In phase 2, day 8 to 20 post weaning, pigs had an average start weight of 15.8 lbs.

Diets were formulated to:

| | Phase 1 | Phase 2 |
|---|---|---|
| | 23.6 wt. % CP | 20.2 wt. % CP |
| | 5.5 wt. % Fat | 2.7 wt. % Fat |
| | 1.56 wt. % Lys | 1.31 wt. % Lys |
| | 0.99 wt. % Ca | 0.90 wt. % Ca |
| | 0.86 wt. % P | 0.78 wt. % P |
| | 0.53 wt. % Na | 0.37 wt. % Na |
| | 124 ppm Cu | 250 ppm Cu |
| | 2650 ppm Zn | 2650 ppm Zn |
| | 3400 kcal ME | 3200 kcal ME |
| | 17.8 wt. % Lactose | 10.8 wt. % Lactose |

Growth performance in Phase 1 only showed numerical differences between treatments. This is consistent with the previous project regarding MBP. Inclusion of either nucleic acids and MBP improved average daily gain and average daily feed intake. The treatments with 0.24 wt. % added nucleotides and 0.75 wt. % MBP performed equally the same and were the treatments with the best numeric performance. Oddly, the combined treatment of 0.24 wt. % added nucleotides and 0.07 wt. % chondroitin sulfate preformed the poorest. These numeric results are consistent in strength and direction with previous projects.

TABLE 6

Pig Performance in Phase 1

| Dietary Treatment | Gain (lbs/d) | Feed intake (lbs/d) | Feed Efficiency |
|---|---|---|---|
| Neg Ctrl | 0.38 | 0.46 | 1.31 |
| 0.12% NTs | 0.40 | 0.48 | 1.56 |
| 0.24% NTs | 0.42 | 0.50 | 1.32 |
| 0.36% NTs | 0.40 | 0.47 | 1.36 |
| 0.07% CS | 0.36 | 0.44 | 1.55 |
| 0.14% CS | 0.38 | 0.45 | 1.30 |
| 0.24% NTs + 0.07% CS | 0.35 | 0.43 | 1.44 |
| 0.75% MBP | 0.42 | 0.50 | 1.24 |

TABLE 7

Pig Performance in Phase 2

| Dietary Treatment | Gain (lbs/d) | Feed intake (lbs/d) | Feed Efficiency |
|---|---|---|---|
| Neg Ctrl | 0.83 | 1.08 | 1.32 |
| 0.12% NTs | 0.90 | 1.17 | 1.31 |
| 0.24% NTs | 0.87 | 1.16 | 1.35 |
| 0.36% NTs | 0.82 | 1.09 | 1.33 |
| 0.07% CS | 0.87 | 1.16 | 1.33 |
| 0.14% CS | 0.77 | 1.05 | 1.39 |
| 0.24% NTs + 0.07% CS | 0.80 | 1.07 | 1.34 |
| 0.75% MBP | 0.89 | 1.18 | 1.33 |

Addition of synthetic nucleotides to diets tended to result in quadratic responses in average daily gain and average daily feed intake with 0.12 wt. % added nucleotides supporting the most improved response. Inclusion of 0.36 wt. % added nucleotides resulted in similar responses as the negative control diet. Feed efficiency was not affected. The 0.75 wt. % added MBP treatment showed similar responses to the 0.12 wt. % and 0.24 wt. % added nucleotide treatments. Inclusion of chondroitin sulfate ("CS") appeared to result in a linear reduction of feed efficiency, while no differences were observed in average daily gain and average daily feed intake.

A tendency for a room treatment effect was found for feed efficiency ($P<0.06$). Pigs from the room where pigs grew slower in Phase 1, tended to have a more improved feed efficiency due to nucleotide and MBP inclusion than did pigs from the other rooms. The observed tendency is in agreement with the hypothesis. The lower feed intake of the pigs from the less performing room in Phase 1 likely caused a greater degree of villi damage. Once the pigs started eating and the need for villi regeneration would be expected to increase and the availability of nucleotides could have increased the nutrient availability for villi regeneration.

Overall in Phases 1 and 2, the inclusion of synthetic nucleotides resulted in quadratic responses of average daily gain and average daily feed intake. The most improved responses were seen at 0.24% added synthetic nucleotide. Feed efficiency was not significantly affected. The response 0.24% added synthetic nucleotide is similar to the 0.75% MBP treatment, suggesting that the nucleic acids may be the active component in MBP. Addition of CS showed a linear decrease in feed efficiency.

TABLE 8

Pig Performance in Phase 1-2

| Dietary Treatment | Gain (lbs/d) | Feed intake (lbs/d) | Feed Efficiency |
|---|---|---|---|
| Neg Ctrl | 0.67 | 0.87 | 1.30 |
| 0.12% NTs | 0.72 | 0.93 | 1.29 |
| 0.24% NTs | 0.73 | 0.95 | 1.31 |
| 0.36% NTs | 0.67 | 0.87 | 1.30 |
| 0.07% CS | 0.70 | 0.91 | 1.31 |
| 0.14% CS | 0.64 | 0.86 | 1.35 |
| 0.24% NTs + 0.07% CS | 0.64 | 0.84 | 1.32 |
| 0.75% MBP | 0.72 | 0.94 | 1.30 |

Nucleic acids appear to be the active component in MBP since the addition of similar levels of synthetic nucleotides matched the performance of the positive control MBP treatment. Although the observed differences simply represent potential tendencies, the improvements in performance were consistently in a positive direction. The magnitude of response has been consistent over a number of trials. Diets containing CS did not show improvements in average daily gain and average daily feed intake, while feed efficiency tended to get poorer with increasing CS levels.

This experiments reported in this example and Examples 2 and 3 showed positive results for MBP and synthetic nucleotide inclusions. The maximum response to synthetic nucleotide and MBP is reached at lower inclusion rate for phase 2 animals. Newly weaned pigs appear to benefit from a higher concentration of nucleic acids and/or nucleotides than starter pigs (pigs weighing circa 15 lbs.). Newly weaned pigs are believed to have a higher level of epithelial cell regeneration due to the effects of weaning on villi length. Nucleic acids are believed to be needed to facilitate cell division and differentiation. Therefore, a pig with a rapid growing intestinal tissue would be expected to benefit from a higher nucleic acid inclusion rate.

Example 5

Feeding Trial Comparing Nucleic Acids from Mucosa Byproducts to Synthetic Nucleotides As demonstrated by the results in Examples 2-4, the growth performance of young pigs can be improved with increased nucleic acid content in their diet. To illustrate the effectiveness of natural nucleic acids from mucosa byproducts versus a mixture of synthetic nucleotides (a 50:50 mixture of IMP+GMP; available commercially from Ajinimoto), the results with mucosal byproducts added at 0.40 wt. % and 0.75 wt. % were summarized together with the results with the addition of 0.40 wt. %. The results of the feeding study are summarized in Table 9 below. The results presented as % gain or loss relative to a corresponding control diet, which did not contain any added mucosal byproducts or synthetic nucleotides.

TABLE 9

Growth Response to Nucleic Acid Inclusion*

| Ingredient | % NA | Phase 1 | | | Phase 2 | | | Phase 3 | | |
|---|---|---|---|---|---|---|---|---|---|---|
| | | ADG* | ADFI** | F:G*** | ADG | ADFI | F:G | ADG | ADFI | F:G |
| Mucosa byproducts | .40 | +19% | +9% | −18% | −3% | −5% | +2% | — | — | — |
| Mucosa byproducts | .75 | +11% | +9% | −5% | +7% | +9% | +1% | +7% | +8% | 0% |
| Synthetic Nucleotides | .12 | +5% | +4% | +19% | +8% | +8% | −1% | +7% | +7% | −1% |

*ADG—average daily gain; ADFI—average daily feed intake; F/G—feed efficiency.
Nucleic acids are the main component responsible for the effect on animal performance.
Mucosa byproducts are ingredients high in nucleic acids. The levels are significantly higher (50x) than the next highest related commercial ingredients (yeasts and peptone products).
Addition of mucosa byproducts and/or synthetic nucleotides generally improve gain and feed efficiency in a linear fashion (across phase 1-2 performance).
Mucosa byproducts and synthetic nucleotides generally also increase feed intake.

The invention has been described with reference to various specific and illustrative embodiments and techniques. However, one skilled in the art will recognize that that many variations and modifications may be made while remaining within the spirit and scope of the invention.

What is claimed is:

1. An animal feed comprising about 0.1 to 2.5 wt. % (based on total feed weight) of a mucosa byproduct;
   wherein the mucosa byproduct includes (based on total byproduct weight) no more than about 5 wt. % proteinaceous material ; at least about 20 wt. % mucopolysaccharides; and at least about 10 wt. % nucleic acid material; and is produced by a process which includes:
   digesting animal mucosal material to form a mucosal digest; and
   removing a protein-enriched stream from the mucosal digest to provide a polyanionic-enriched stream, which includes mucopolysaccharides and nucleic acid material.

2. The animal feed of claim 1 further comprising:
   about 1 to 6 wt. % fat;
   about 2 to 6 wt. % fiber; and
   about 5 to 30 wt. % lactose.

3. The animal feed of claim 1, wherein said animal feed includes about 18 to 30 wt. % crude protein.

4. The animal feed of claim 1, wherein said animal feed includes about 0.01 to 0.5 wt. % nucleic acid material.

5. The animal feed of claim 4, wherein said animal feed includes about 0.1 to 0.5 wt. % nucleic acid material.

6. The animal feed of claim 1, wherein said animal feed includes about 200 ppm to 5,000 ppm mucopolysaccharides.

7. The animal feed of claim 1, wherein said animal feed includes about 100 ppm to 2,500 ppm chondroitin material.

8. The animal feed of claim 7, wherein said animal feed includes about 100 ppm to 600 ppm chondroitin material.

9. The animal feed of claim 1, wherein said animal feed includes about 2,000 ppm to 4,000 ppm nucleic acid material and about 1,000 ppm to 3,000 ppm mucopolysaccharides.

10. The animal feed of claim 1, wherein said animal feed includes about 200 ppm to 4,000 ppm nucleic acid material and about 100 ppm to 3,000 ppm mucopolysaccharides.

11. The animal feed of claim 1, wherein the mucosa byproduct has a crude protein content of no more than about 50 wt. %.

12. The animal feed of claim 1, wherein said animal feed includes about 0.1 to 0.6 wt. % nucleic acid material.

13. The animal feed of claim 1 wherein the mucosa byproduct has a mucopolysaccharide/nucleic acid material weight ratio greater than 1.0.

14. The animal feed of claim 1, wherein the mucosa byproduct includes at least about 20 wt. % nucleic acid material.

15. The animal feed of claim 1, wherein the mucosa byproduct includes about 5 to 20 wt. % chondroitin material.

16. The animal feed of claim 1 wherein the mucosa byproduct includes no more than about 2 wt. % fat.

17. The animal feed of claim 1, wherein said animal feed includes about no more than about 30 wt. % crude protein.

18. The animal feed of claim 1 comprising about 18 to 23 wt. % crude protein; at least about 0.1 wt. % mucopolysaceharides; and further comprising about 1 to 6 wt. % fat and about 2 to 6 wt. % fiber; about 6 to 10 wt. % lactose.

19. The animal feed of claim 1 comprising about 18 to 23 wt. % crude protein and about 0.1 to 0.6 wt. % nucleic acid material; and further comprising about 1 to 6 wt. % fat and about 2 to 6 wt. % fiber; about 6 to 10 wt. % lactose.

20. The animal feed of claim 1 further comprising about 6 to 20 wt. % lactose.

21. The animal feed of claim 1 wherein the mucosa byproduct comprises (based on total byproduct weight) at least about 5 wt. % chondroitin material.

* * * * *